Figure 1:
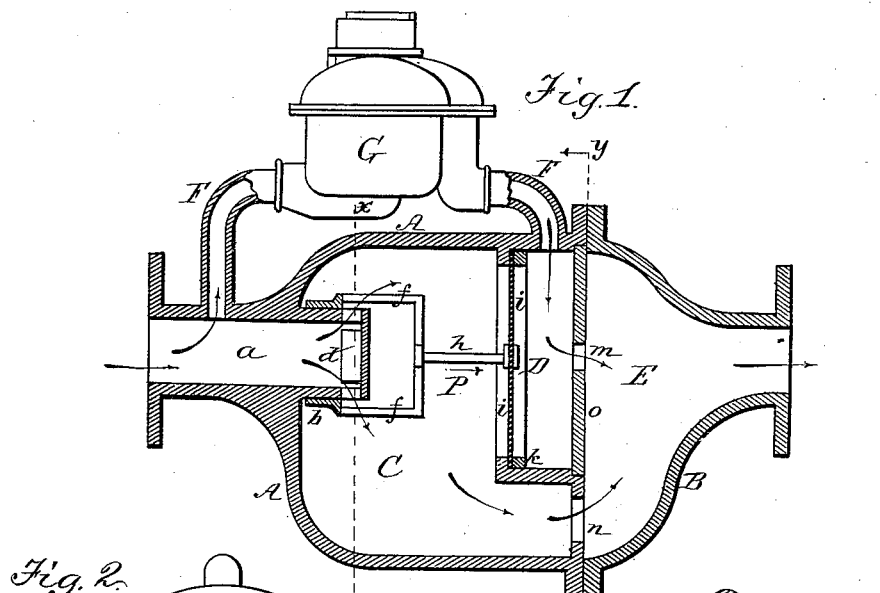

(No Model.)

L. H. NASH.
METHOD OF OPERATING PROPORTIONAL WATER METERS.

No. 336,147. Patented Feb. 16, 1886.

Attest:
R. E. Grant
G. E. Tucker

Inventor:
Lewis Hallock Nash
by his Attorneys
Johnson and Johnson

UNITED STATES PATENT OFFICE.

LEWIS HALLOCK NASH, OF BROOKLYN, ASSIGNOR TO THE NATIONAL METER COMPANY, OF NEW YORK, N. Y.

METHOD OF OPERATING PROPORTIONAL WATER-METERS.

SPECIFICATION forming part of Letters Patent No. 336,147, dated February 16, 1886.

Application filed April 13, 1885. Renewed December 9, 1885. Serial No. 185,169. (No model.)

*To all whom it may concern:*

Be it known that I, LEWIS HALLOCK NASH, a citizen of the United States, residing at Brooklyn, in the county of Kings and State of New York, have invented new and useful Improvements in Methods of Operating Proportional Water-Meters, of which the following is a specification.

Meters have been constructed to effect a division of the passing volume of the water into separate volumes, in which only one of the volumes is passed through a metered passage, so that its measurement will indicate the entire quantity of water which may pass to the service-pipe in both volumes. In such division of the flowing body of the water the proportionate volumes of the two separate streams are so regulated that they will bear the same relation to each other and to the entire quantity of water that enters the meter, so that the division or portion which enters and passes through the metered passage should represent a given and definite proportion of the entire volume, and the measurement it produces should be the indication of measurement of the whole passing volume. So far as I know and can find, such division and proportionate regulation of the separate currents have been effected by valves operated by the direct action of the water to control the area of the division-passages of the meter to the proportionate quantity of water passing through them, and the force used to regulate the delivery of the water and to open the valve-ports proportionately is the whole of the moving stream entering the meter. The accomplishment of this result is not sufficient to effect and determine a proper measurement of the water passing through two separate passages or chambers of entirely different character without provision for regulating the resistance in the two separate chambers or passages to make the pressure in both equal.

My invention embraces a new method of operation in a device for measuring water, in which the volume of the water passing through a pipe is divided into two streams, one of which operates the indicating mechanism and the other is the main current and does not affect the indicating mechanism, the resistance to the flow of the water in said main current being made at all times equal to the resistance in the metered current, and the flow through the outlet-orifices effected thereby under the same conditions of pressure. In this method the governing principle in controlling the action of the device is the law that, if water flows from a chamber having a uniform pressure into another chamber having a different uniform pressure through two or more orifices, the quantity of water discharged through each orifice will be proportionate to its hydraulic capacity or size, and the flow from said chambers into a chamber common to both will be with a uniform pressure—that is to say, water flowing from two chambers having the same pressure into one common chamber, the conditions as to pressure in all are the same, and it is obvious that such conditions are vital to obtain from one stream of a divided volume of water an accurate and proper measurement and indication of the combined volumes of both streams. In carrying out this method I lead each of the divided streams into separate chambers, having provision for controlling the pressure so that it will always be the same in each, and then depend upon the outlet-orifices to deliver from each a proper proportionate quantity of water. In this operation it makes no difference what may be the resistance in the meter communicating chamber, for whatever it is the resistance-controlling device will operate so as to cause exactly the same degree of resistance to the water entering the other chamber, to the end that the flow of water through orifices of a given but unequal area under the same conditions of pressure will cause a definite resistance to the flow of water in the main chamber, which, in fact, thereby constitutes the measuring device, while the metered chamber forms the indicating device. The two chambers which I have described as giving the same resistance to the flow of water through them are separated from each other by a movable or flexible partition, so that the pressure therein shall always be the same, and the outlet-orifices from these chambers open into a common passage or chamber, so that the pressure is always equal in all parts, and therefore the quantity of water discharged from each chamber will be proportionate to the sizes of such orifices. The pressure in these two receiving-chambers is always maintained in equal degrees by a valve for one or both of the supply-passages connected with and controlled by the movable or flexible partition, so that if one of these chambers is too freely supplied with water the pressure in the chambers will thereby become unequal, and moving the partition, will also move the valve so as to partially close the supply to such chamber, and thus preserve the rate of flow from the two chambers.

The accompanying drawings illustrate my said water-measuring device as applied to an indicating device known as a "meter," in which—

Figure 2:
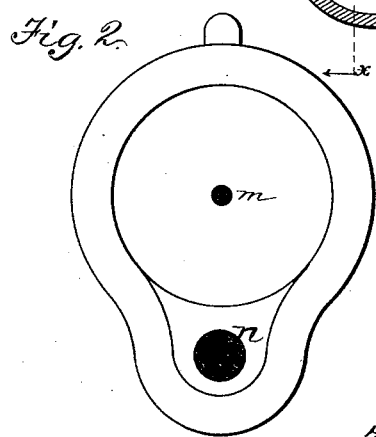
Figure 3:
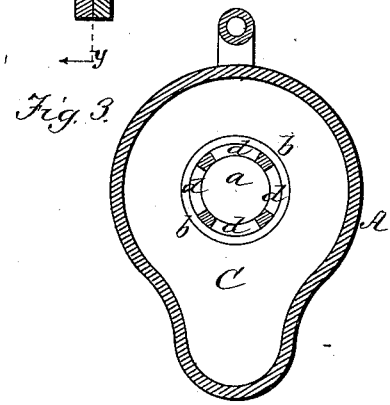
Figure 4:
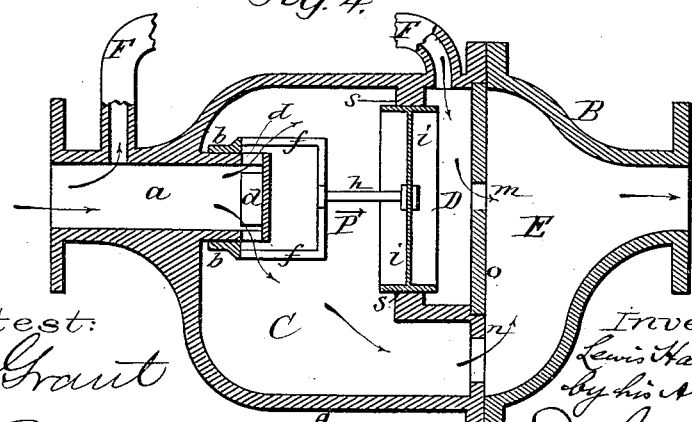

Figure 1 represents a vertical longitudinal section, the working indicating device being in elevation; Fig. 2, a cross-section taken on the line $y\,y$ of Fig. 1, showing the discharge-orifices from the separate chambers; Fig. 3, a cross-section taken on the line $x\,x$ of Fig. 1, showing the valved inlet to the main chamber; and Fig. 4 represents a vertical section of the measuring device, with a modification of its movable chamber-division.

The means for carrying out this new method is not confined in its application to any particular construction of working devices for operating the indicating mechanism, which is arranged in what is known as the "meter," the inclosing-case G of which I have shown in elevation as connecting with the inlet-pipe.

The measuring device proper consists of a shell, A, formed like pipe-fittings, independent of the meter-case G, and divided into two chambers, C and D, which communicate with an end chamber, E, which forms the discharge-passage through the cover B, which connects with the service-pipe. Both chambers C and D communicate with the inlet $a$ and with the outlet E by different passages. The division of the chambers C and D is formed by a flexible diaphragm, $i$, as in Fig. 1, or by a piston-head partition, as in Fig. 4, either being caused to move only when the pressure in one chamber is greater than that in the other. Such movable division preferably stands at right angles to and in the line of the inlet-passage $a$, and is connected with and controls a valve which controls the supply of the water into the chamber C from the pipe $a$, as will be presently explained.

Preferably the chambers C and D are of unequal area, and the chamber D is formed by and between the said movable division and the end plate, $o$, so as to allow the chamber C to communicate with the discharge-chamber E at one side of the said chamber D, which communicates with the working-chamber of the indicating device, which latter communicates with the inlet-passage $a$ by a pipe, F, so that the volume of the water is divided at the inlet-passage. The inlet-pipe extends into the chamber C and terminates in valve-ports $d\,d$ opening therein, which are controlled by a ring-valve, $b$, which is connected with the movable diaphragm $i$ by the rods $f$ and central rod, $h$. When a flexible partition is used, it is seated in that side of the chamber D which it closes, and is held by a ring, $k$, or otherwise.

The outlet-orifices of the chambers C and D are formed in the end plate, $o$, at $m\,n$, the sum of the area of which may be equal to that of the inlet-passage $a$, and may be of any size not too large for effective action. In place of the single orifices shown, a number of smaller ones may be used, their combined area having the same action as the single ones; or any desired form of orifices may be used.

When the chamber-division $i$ is made like a piston-head, it is fitted to slide between seats $s$, just as a piston slides upon the walls of the cylinder.

I prefer to make the shell A depart from a cylindrical form, to provide a water-passage from the chamber C at the side of the chamber D.

The operation of the measuring device is as follows: Water, entering the passage $a$ from the street-main, is divided into two streams, one passing through the pipe F into the working-chamber of the indicating device to operate the latter, and thence into the chamber D, and the other stream passing through the ports $d\,d$ into the chamber C. From these chambers the water passes under equal pressure into the discharge-chamber E, whence it passes into the service-pipe. With this arrangement of receiving-chambers and controlling-valve the interposition of the movable partition to control said valve to equalize the pressure of the separate moving volumes of water is of primary importance, since it will move under the slightest change in the pressure in either chamber. As the flow in chamber C will be more easy than in chamber D, the equalizing provision is directed to prevent any greater pressure in said chamber C. Should the pressure in this chamber increase from any cause, the division or diaphragm will move into the chamber D, drawing the valve $b$ with it in the direction of the arrow P, partially closing the inlet-ports $d$, and allow the pressure to become equal again. The pressure in the chamber being thus always made equal, the quantity of water discharged from each chamber will depend on the size of the discharge-orifices $m$ and $n$, and since they discharge into the same passage, the quantities will bear a fixed relation to each other, and hence the sum of the discharges will be indicated by the device operated by one of the divided streams of water. The direction of the flow of the water may be reversed, in which case the valve would be operated to prevent the too rapid escape of the water from the chamber C.

It will be understood that the indicating mechanism must be so adjusted that while indicating only a small portion of the passing water it will show the entire quantity of which the given portion entering the meter is measured.

The advantages of measuring a part only of the whole volume passing through a meter to give the sum total of the whole are that it admits of the use of more sensitive indicating mechanism, effects a more accurate measurement, and permits the use of a comparatively small meter for a large supply of water.

The device in its construction and combination herein described and illustrated in the drawings for carrying out the method of measuring a divided volume of flowing water, so that the resistance to the flow of both streams will be equalized under all conditions of the flow, is not claimed herein, as such matter is made the subject of a separate and distinct application for a patent filed by me of even date herewith.

I claim—

1. The improved method herein described of measuring water flowing through a pipe and indicating the quantity of such flow, which consists in dividing the flowing volume into two streams, causing one stream to pass through a metered passage into a receiving and discharging chamber, and controlling the flow of the other stream into a separate chamber by automatically and consonantly regulating the pressure in the said separate chambers, substantially as herein set forth, for the purpose stated.

2. The method herein described of measuring flowing water by causing its discharge through separate orifices under the same conditions of pressure, which consists in dividing the stream into two volumes, equalizing the pressure of each volume at its outlet-orifices by means of any variation in such pressure of the streams at said orifices, and measuring the flow of one of these streams by an indicating device.

3. The method herein described of measuring water flowing through a pipe and registering the quantity of such flow, which consists in dividing the flowing volume into two streams, one of which is measured, the other passing through a separate channel, controlling the proportion of both streams by passing them through given-sized orifices under the same conditions of pressure, and automatically regulating the pressure in said separate streams at the outlet-orifices, substantially as described.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.